(12) United States Patent
Nagano et al.

(10) Patent No.: US 7,886,297 B2
(45) Date of Patent: Feb. 8, 2011

(54) PROGRAM CONTROL PROCESS FOR AN INFORMATION PROCESSING APPARATUS

(75) Inventors: Kyohei Nagano, Yokohama (JP); Mutsuko Kondo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1483 days.

(21) Appl. No.: 11/283,117

(22) Filed: Nov. 17, 2005

(65) Prior Publication Data

US 2006/0136920 A1 Jun. 22, 2006

(30) Foreign Application Priority Data

Nov. 22, 2004 (JP) ............................. 2004-337560

(51) Int. Cl.
*G06F 9/46* (2006.01)
(52) U.S. Cl. ...................... 718/101; 718/108
(58) Field of Classification Search ....................... None
See application file for complete search history.

(56) References Cited

U.S. PATENT DOCUMENTS

| 5,065,310 | A | * | 11/1991 | Stone | 718/100 |
| 6,865,739 | B1 | * | 3/2005 | Bourgeois, III | 718/101 |
| 7,185,339 | B2 | * | 2/2007 | Srivastava et al. | 718/104 |
| 7,216,346 | B2 | * | 5/2007 | Bender et al. | 718/102 |
| 2004/0154020 | A1 | * | 8/2004 | Chen et al. | 718/107 |
| 2005/0125789 | A1 | | 6/2005 | Dijkstra et al. | |

FOREIGN PATENT DOCUMENTS

| JP | 63-280347 A | 11/1988 |
| JP | 01-140237 | 6/1989 |
| JP | 03-260838 A | 11/1991 |
| JP | 04-175938 A | 6/1992 |
| JP | 06-59914 | 3/1994 |
| JP | 11-003231 A | 1/1999 |
| JP | 2001-125800 | 5/2001 |
| JP | 2002-530737 | 9/2002 |
| JP | 2002-297402 A | 10/2002 |
| JP | 2004-005612 A | 1/2004 |
| WO | WO03/062988 | 7/2003 |

OTHER PUBLICATIONS

Japan Patent Office (JPO) office action for patent application JP2004-337560 (Mar. 27, 2008).
Japan Patent Office (JPO) office action for patent application JP2004-337560 (Jul. 8, 2008).
Japan Patent Office (JPO) office action dated Sep. 26, 2008 for JPO patent application JP2008-144669.
Japan Patent Office (JPO) office action dated Mar. 3, 2009 for JPO patent application JP2008-144669.

* cited by examiner

*Primary Examiner*—Emerson C Puente
*Assistant Examiner*—Camquy Truong
(74) *Attorney, Agent, or Firm*—Townsend and Townsend and Crew LLP

(57) ABSTRACT

In an information processing apparatus which executes first and second threads which executes methods, the first thread transmits a stop instruction for terminating execution of the second thread to the second thread. In response to the reception of the stop instruction, the second thread terminates execution of a first method in execution and initiates execution of the second method which should be executed subsequent to the first method.

10 Claims, 13 Drawing Sheets

| THREAD ID | CALL STACK | LOCK INFORMATION | TRANSACTION INFORMATION |
|---|---|---|---|
| THREAD 1 | OBJECT N, METHOD X ADDRESS 0x****** | 8AD9C840 | jdbc:hitachidbms://testdb@localhost:9999 |
| | ⋮ | CAFEEFAC | jdbc:hitachidbms://test2db@localhost:9999 |
| | OBJECT 3, METHOD C ADDRESS 0x****** | 333C7BC4 | |
| | OBJECT 2, METHOD B ADDRESS 0x****** | | |
| | OBJECT 1, METHOD A ADDRESS 0x****** | ⋮ | ⋮ |
| | ⋮ | | |
| ⋮ | ⋮ | ⋮ | ⋮ |

FIG.4

| CONDITION | MAXIMUM RUN DURATION (s) |
|---|---|
| pacX.pacY.ClassA.* | 30 |
| pacX.pacY.ClassB.doFilter | 180 |
| pacX.pacY.pacZ.ClassC.* | 10 |

| THREAD ID | STATE | METHOD | START TIME | MAXIMUM RUN DURATION (s) |
|---|---|---|---|---|
| THREAD 1 | IN EXECUTION | OBJECT 1, METHOD A | 13:25.12 | 30 |
| | | OBJECT 3, METHOD CA | 13:25.17 | 10 |
| | | OBJECT 7, METHOD T | 13:25.20 | 10 |
| THREAD 2 | TIME OUT | OBJECT 4, METHOD D | 13:24.33 | 180 |
| | | OBJECT 2, METHOD B | 13:25.02 | 120 |
| ⋮ | ⋮ | ⋮ | ⋮ | ⋮ |

FIG.6

PROGRAM CONTROL PROCESS FOR AN INFORMATION PROCESSING APPARATUS

CROSS-REFERENCE TO RELATED APPLICATIONS

The present application claims priority from Japanese patent application No. 2004-337560 filed on Nov. 22, 2004, which is herein incorporated by reference.

BACKGROUND OF THE INVENTION

1. Field of the Invention

The present invention relates to a program control method for an information processing apparatus, as well as to the information processing apparatus and a program.

2. Description of the Related Art

In a mechanism for parallel processing of a plurality of threads, a mechanism is known which forcibly terminates each thread if a processing load for that thread becomes too large. See for example Japanese Patent Application Laid-Open Publication No. 2001-125800.

In the mechanism for forcibly terminates each thread, for example, if a method causing the forcible termination obtains a lock to a shared resource and if a method subsequent to that method releases the lock, since a thread is terminated before the subsequent method is executed, it is problematic that the lock is not released and that consistency of the processing cannot be ensured.

SUMMARY OF THE INVENTION

The present invention was conceived in view of the above problem, and it is therefore an object of the present invention to provide a program control method for an information processing apparatus, the information processing apparatus and a program that can ensure consistency of the processing for each thread.

In order to solve the above and other problems, according to an aspect of the present invention there is provided a process for a method in an information processing apparatus executing first and second threads executing methods. The first thread transmits an execution termination instruction of the second thread to the second thread. The second thread, in response to the reception of the execution termination instruction, terminates execution of a first method in execution and initiates execution of a second method that is to be executed subsequent to the first method.

BRIEF DESCRIPTION OF THE DRAWINGS

The above and other objects, aspects, features and advantages of the present invention will become more apparent from the following detailed description when taken in conjunction with the accompanying drawings, in which:

FIG. 4 is a diagram showing a configuration example of a method processing information storage unit 251, according to one implementation of the present invention;

FIG. 5 is a diagram showing a configuration example of a maximum run duration storage unit 252, according to one implementation of the present invention;

FIG. 6 is a diagram showing a configuration example of a thread information storage unit 253, according to one implementation of the present invention;

DETAILED DESCRIPTION OF THE INVENTION

Figure 1:
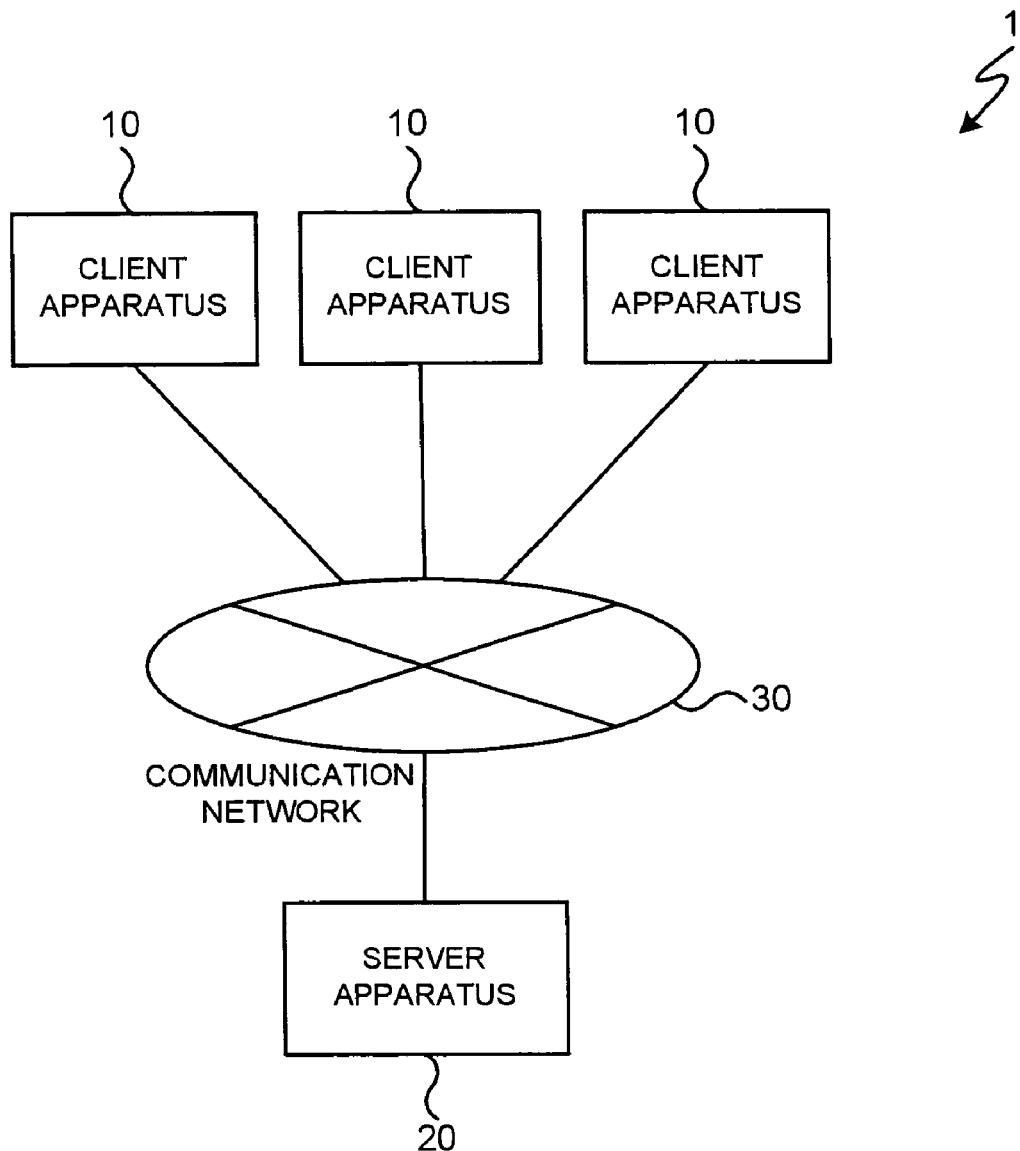
FIG. 1 is a diagram showing an overall configuration of an information processing system 1 of the implementation, according to one implementation of the present invention.

FIG. 1 shows an overall configuration of an information processing system 1 of the implementation. The information system 1 is constituted by including client apparatuses 10 and server apparatus 20. The client apparatuses 10 and server apparatus 20 are connected via communication network 30 in a manner enabling mutual communication. The communication network 30 is the Internet, LAN (Local Area Network), wireless network, public telephone lines or cellular telephone network, for example.

The client apparatus (an information processing apparatus) 10 is a personal computer or workstation, for example. The client apparatus 10 runs a web browser. The server apparatus 20 provides a web service, for example, an online bookstore and the like, and a user accesses the server apparatus 20 by operating the web browser running on the client apparatus 10.

The server apparatus 20 is a personal computer or workstation, for example. The server apparatus 20 runs an application server with server-side Java (trademark or registered trademark of Sun Microsystems, Inc.) providing dynamic web pages or images in response to a request for a certain URL (Uniform Resource Locator).

The application server realizes a function which provides a function for connecting to a database and a transaction management function for coupling a plurality of pieces of processing (hereinafter, referred to as a container). The container executes a program written in the Java (trademark or registered trademark of Sun Microsystems, Inc.) language. In this way, various functions are realized in the application server. A specific container is, for example, a servlet container or EJB (Enterprise JavaBeans: trademark or registered trademark of Sun Microsystems, Inc.) container, for example.

The application server executes a plurality of threads. If a program realizing the application is written in a functional or a procedural language, the thread is a process which is a unit of processing managed by an operating system. A specific example of the thread is, for example, a thread which is a unit of processing in the Java Virtual Machine (trademark or registered trademark of Sun Microsystems, Inc.). The thread executes a series of procedures. These procedures are methods or programs of objects generated from classes of Java (trademark or registered trademark of SunMicrosystems, Inc.), for example. Hereinafter, the methods and programs of objects, i.e., the procedures executed in the thread are collectively referred to as methods.

Figure 2:
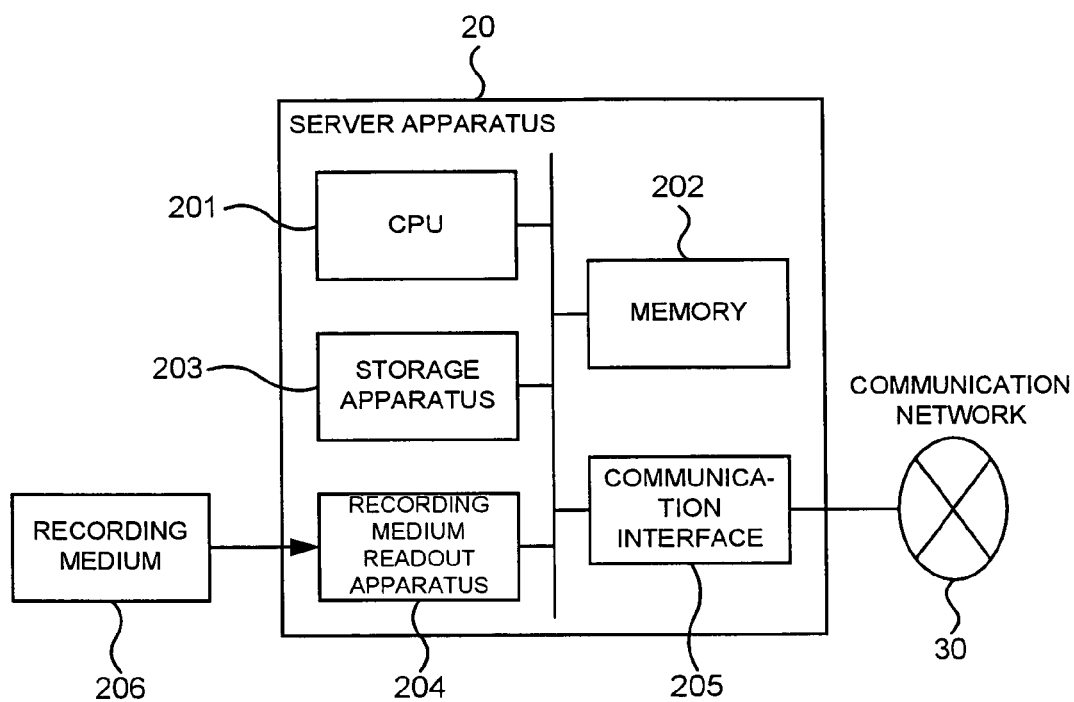
FIG. 2 is a diagram showing an example of a hardware configuration of a server apparatus 20, according to one implementation of the present invention.

FIG. 2 shows a hardware configuration of the server apparatus 20. As shown in the Figure, the server apparatus 20 is comprised of a CPU 201, a memory 202, a storage apparatus 203, a recording medium readout apparatus 204 and a communication interface 205.

The storage apparatus 203 is a hard disk or flash memory, for example. The storage apparatus 203 stores programs and data. The recording medium readout apparatus 204 reads out programs and data stored in a recording medium 206 to store into the memory 202 or storage apparatus 203. The recording medium readout apparatus 204 is a CD-ROM drive, a DVD-ROM drive, a magnetic tape drive, a memory card reader and the like, for example. The recording medium 206 is a CD-ROM, a DVD-ROM, a magnetic tape, a hard disk, a flash memory and the like, for example. The CPU 201 is responsible for overall control of the server apparatus 20 and realizes various functions by reading out to the memory 202 and executing programs stored in the storage apparatus 203. The communication interface 205 is an interface for connecting to the communication network 30. The communication interface 205 is a modem connected to a public telephone line or an Ethernet (registered trademark) adapter, for example.

The server apparatus 20 may be comprised of a plurality of CPUs 201 or may be realized by a cluster system connecting a plurality of computers.

Figure 3:
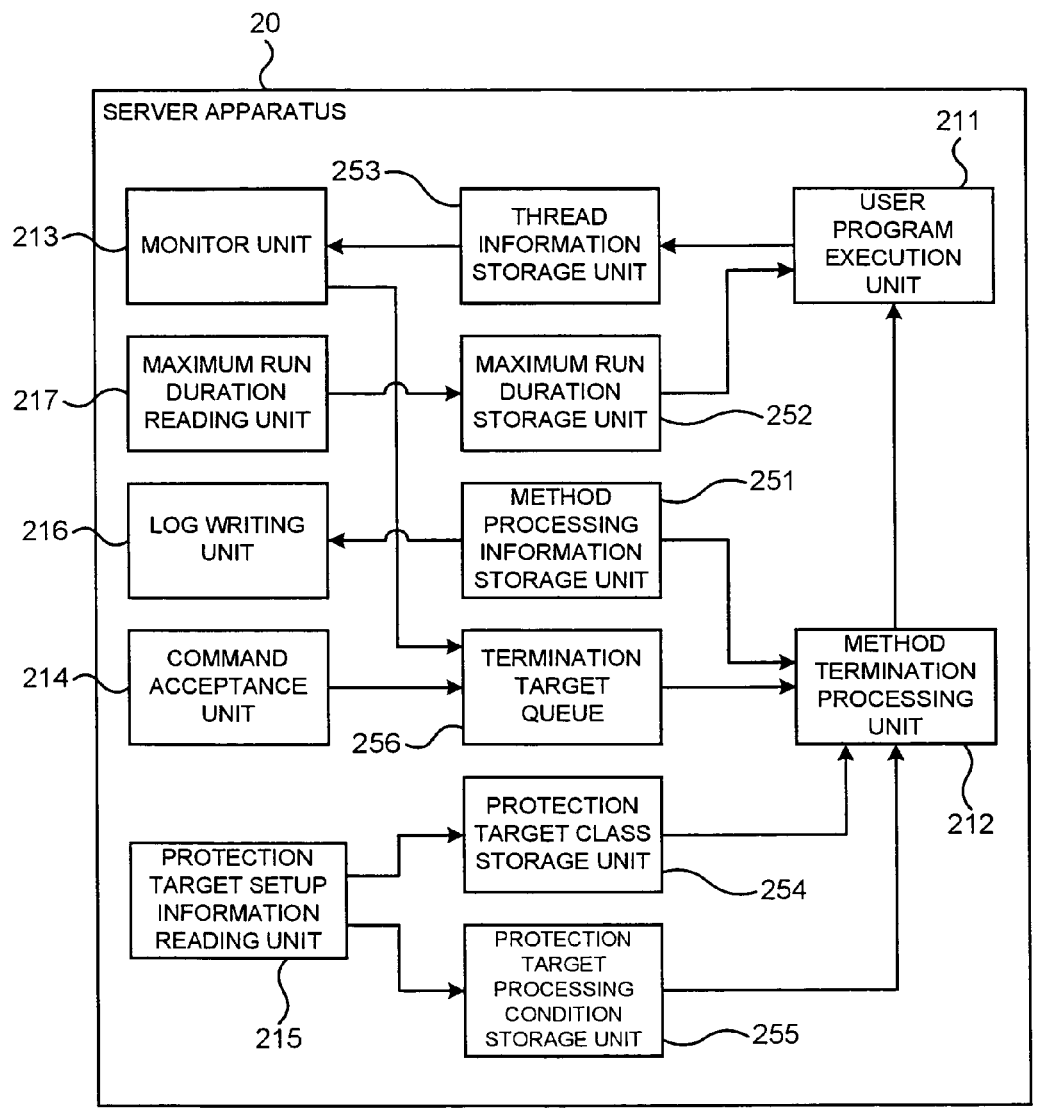
FIG. 3 is a functional block diagram of the server apparatus 20, according to one implementation of the present invention.

FIG. 3 shows functions realized in the server apparatus 20. As shown in the figure, the server apparatus 20 realizes a user program execution unit 211, a method termination processing unit 212, a monitor unit 213, a command acceptance unit 214, a protection target setup information reading unit 215, a log writing unit 216, a maximum run duration reading unit 217, a method processing information storage unit 251, a maximum run duration storage unit 252, a thread information storage unit 253, a protection target class storage unit 254, a protection target processing condition storage unit 255 and a termination target queue 256.

The method processing information storage unit 251 stores information about processing of method executed by a thread for each thread executed in the Java (trademark or registered trademark of Sun Microsystems, Inc.) virtual machine. FIG. 4 shows a configuration of the method processing information storage unit 251. As shown in the figure, the method processing information storage unit 251 stores a list of information about methods called in a thread (hereinafter, referred to as method information), a list of object IDs identifying an object to which an exclusive lock is obtained (hereinafter, referred to as lock information) and a list of database names identifying a database for which transaction processing is initiated, correspondingly to information for identifying each thread (hereinafter, referred to as a thread ID).

For example, In Java (trademark or registered trademark of Sun Microsystems, Inc.), the virtual machine manages objects to which exclusive locks are obtained and the lock information is a list of IDs of the objects which are the targets of the management. The list of the method information is a call stack managed by the virtual machine. The transaction information is managed by the container. When a transaction for a database is initiated by the container, the database name is registered into the transaction information, and when the transaction is committed or rolled back, the database name is deleted from the transaction information. For each thread executed in the virtual machine, by referring to the method processing information storage unit 251, each functional unit of the server apparatus 20 can obtain the method information about a series of executed methods from the call stack, determine from the lock information whether the exclusive lock is currently obtained or not and determine from the transaction information whether the transaction processing is initiated or not.

The maximum run duration storage unit 252 stores information for identifying a method executed in a thread and a maximum run duration of the method in a corresponding manner. FIG. 5 shows a configuration of the maximum run duration storage unit 252. As shown in FIG. 5, the maximum run duration storage unit 252 sets conditions for class names or method names and maximum values of runtime when the methods in accordance with the conditions are executed on the virtual machine. As the maximum run duration, a value is set in units of time, for example.

The maximum run duration reading unit 217 reads the condition and the maximum run duration of the method from a setup file to set into the maximum run duration storage unit 252.

The thread information storage unit 253 (corresponding to "execution start time storage unit" of the present invention) stores a state of a thread and the method information of the method executed in the thread. FIG. 6 shows a configuration of the thread information storage unit 253. As shown in the figure, the thread information storage unit 253 stores the states of the threads correspondingly to the thread IDs and stores a method name, a time when the execution of the method is initiated, and the maximum run duration set to the method for each method executed in the thread. The state of the thread includes "in execution" indicating that the thread is normally executed, "time-out" indicating that the method executed in the thread is timed out, "in termination execution" indicating that termination processing of the method is being executed which is described later, "termination completed" indicating that the termination processing of the method is completed, and the like.

The user program execution unit 211 provides a container function in the application server. Also, by generating an object from a class of a program written by a user (hereinafter referred to as a user program) or by calling a method of the generated object, the user program execution unit 211 executes the user program. Further, the user program execution unit 211 can be provided as a Java class (trademark or registered trademark of Sun Microsystems, Inc.) which is a base class succeeded by user-defined classes.

For each thread executed in the virtual machine, the monitor unit 213 performs time-out monitor processing which detects the time-out of the method in execution by checking whether the runtime of the method executed in the thread exceeds the maximum run duration stored in the maximum run duration storage unit 252. The monitor unit 213 performs the time-out monitor processing in an independent thread to detect the time-out of the method executed in another thread. Details of the time-out monitor processing are described later.

The command acceptance unit 214 accepts input of a command (hereinafter, referred to as a method termination command) instructing to perform processing for terminating execution of a method executed in a specified thread (hereinafter, referred to as method termination processing) from a user. In the method termination command, a thread ID specified by the user is set. The command acceptance unit 214 may accept the method termination command from the input apparatus such as a keyboard or mouse or may receive a request including the method termination command from the client apparatus 10.

The termination target queue 256 is a queue for registering a thread ID identifying a thread which is a target of the method termination processing with the method termination processing unit 212 described later. When detecting time-out of a method executed in another thread, the monitor unit 213 performs registration of a thread ID of the thread executing the detected method into the termination target queue 256. Also, in response to acceptance of the method termination command, the command acceptance unit 214 registers a thread ID set in the method termination command into the termination target queue 256.

The method termination processing unit 212 performs the method termination processing targeted for a method executed in a thread indicated by a thread ID registered in the termination target queue 256. Details of the method termination processing are described later.

Figure 7:
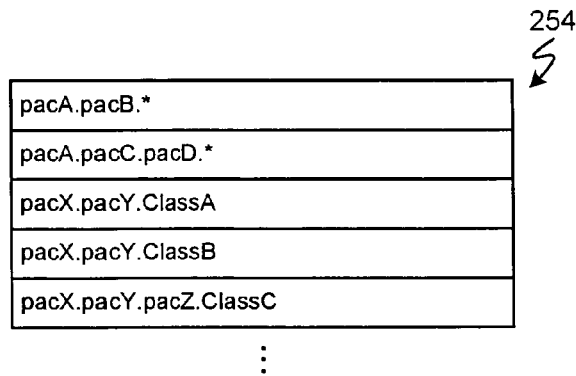
FIG. 7 is a diagram showing an example of a protection target class storage unit 254, according to one implementation of the present invention.
Figure 8:
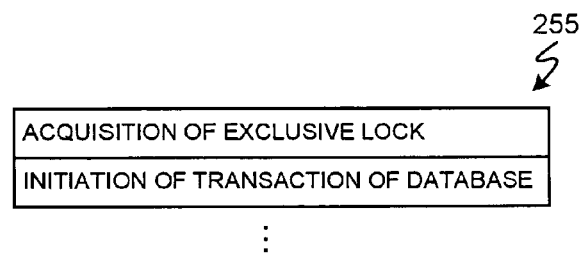
FIG. 8 is a diagram showing an example of a protection target processing condition storage unit 255, according to one implementation of the present invention.

The protection target class storage unit 254 and the protection target processing condition storage unit 255 (corresponding to a "protection method storage unit" of the present invention) stores information identifying a method which is not the target of the method termination processing of the method termination processing unit 212 (which should not be terminated). FIG. 7 shows an example of the protection target class storage unit 254. In the figure, the protection target class storage unit 254 sets conditions for package names and class names of the Java (trademark or registered trademark of Sun Microsystems, Inc.) classes. FIG. 8 is an example of the protection target processing condition storage unit 255. In the figure, the protection target processing condition storage unit 255 sets conditions for processing performed in a method. The target method processing of the conditions specified in the protection target processing condition storage unit 255 is the processing which can be obtained from the call stack, the lock information and the transaction information stored in the method processing information storage unit 251. The conditions are, for example, that a certain method is called, that a lock is obtained for a certain object, and that transaction processing is initiated for a certain database. For the conditions registered in the protection target class storage unit 254 and the protection target processing condition storage unit 255, if the conditions are fulfilled, the method termination processing is not performed by the method termination processing unit 212, as described later.

Figure 9:
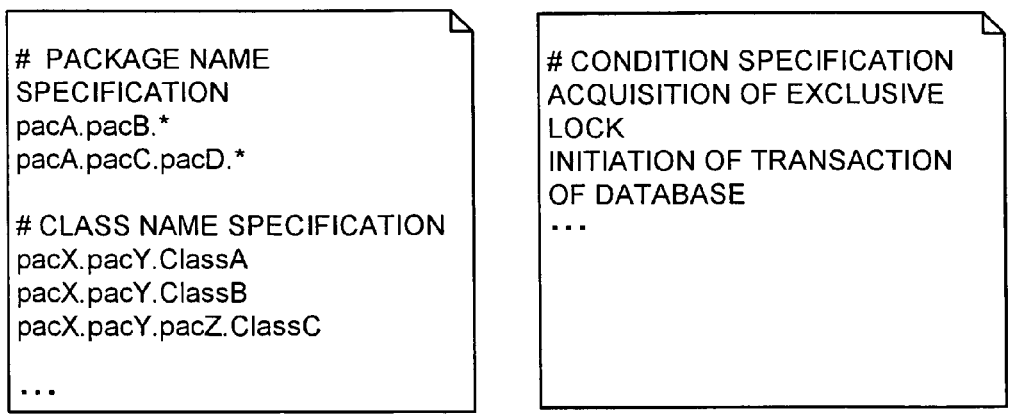
FIG. 9 is a diagram showing an example of a content of a setup file read by a protection target setup information reading unit, according to one implementation of the present invention.

The protection target setup information reading unit 215 reads out conditions of the package names or class names and conditions for the processing content of the method from a predetermined setup file to register the conditions into the protection target class 254 and protection target processing condition storage units 255. FIG. 9 is an example of the content of the setup file read by the protection target setup information reading unit 215. Each line of the setup file describes the condition of the package name or class name, the condition for the processing of the method and the like. In the setup file, a line started with "#" is a comment.

The log writing unit 216 writes data stored in the call stack, the lock information, the transaction information and the like stored in the method processing information storage unit 251 into a log file when the monitor unit 213 detects time-out of a method executed in a thread. Also, after the method termination processing is performed by the method termination processing unit 212, the log writing unit 216 writes data stored in the call stack into a log file. The log writing unit 216 may write the data into a file on a file system managed by an operating system running on the server apparatus 20 or may write the data directly into a recording medium such as a hard disk, magnetic tape, magnet-optical disk, flash memory and the like.

Each functional unit of the user program execution unit 211, the method termination processing unit 212, the monitor unit 213, the command acceptance unit 214, the protection target setup information reading unit 215, the log writing unit 216 and the maximum run duration reading unit 217 is realized by the CPU 201 of the server apparatus 20 executing the program, the method of the object or thread stored in the memory 202, or is realized by hardware. The method processing information storage unit 251, the maximum run duration storage unit 252, the thread information storage unit 253, the protection target class storage unit 254, the protection target processing condition storage unit 255 and the termination target queue 256 are realized on storage areas provided by the memory 202 or storage apparatus 203 of the server apparatus 20. Each functional unit 211 to 217, each storage unit 251 to 255 and the termination target queue 256 can be realized by any one of hardware, a program, an object, a thread and a process.

Figure 10:
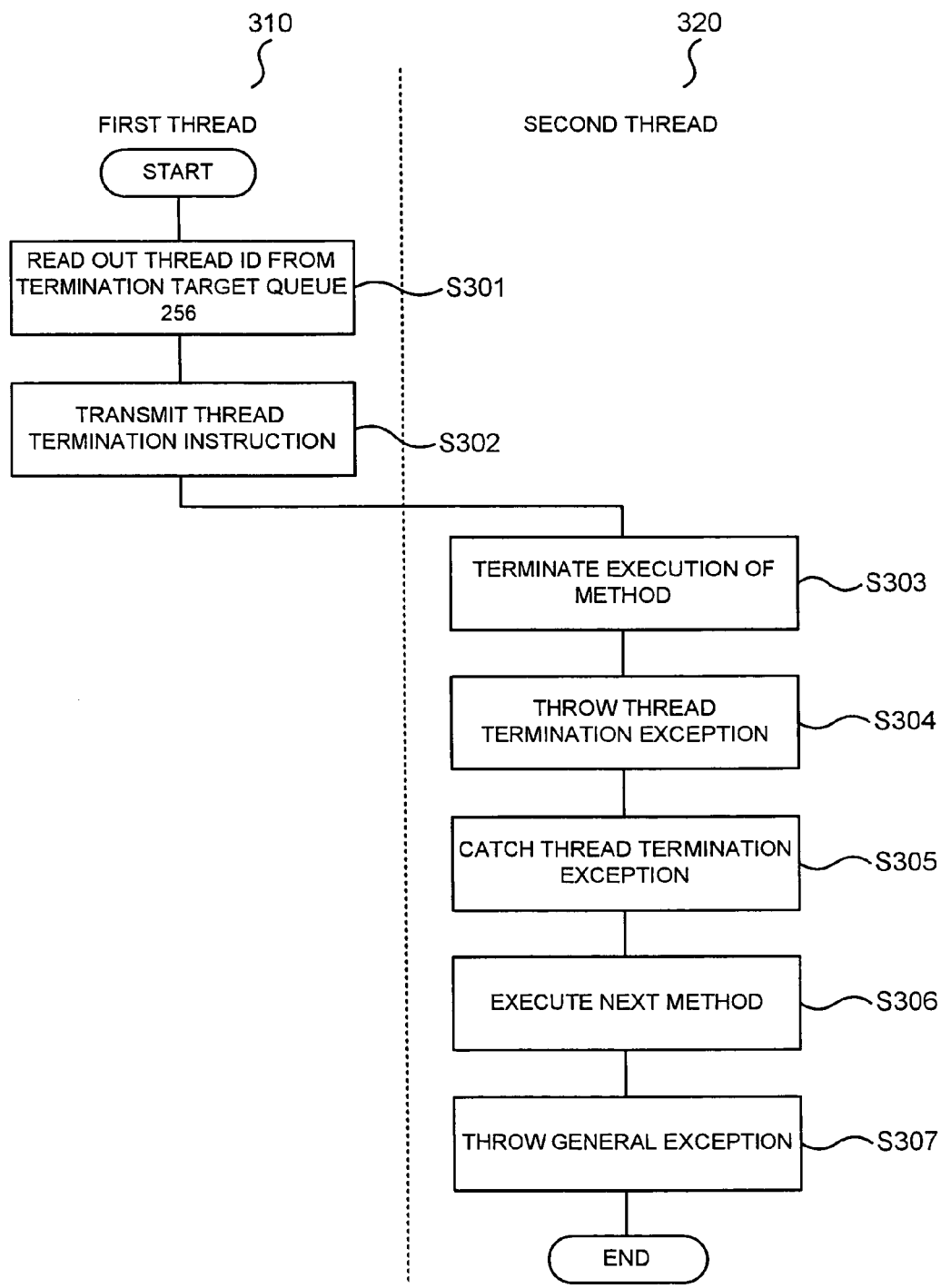
FIG. 10 is a diagram for describing a flow of method termination processing, according to one implementation of the present invention.

FIG. 10 is a diagram for describing a flow of the method termination processing.

A first thread 310 executes a series of methods realizing the method termination processing unit 212 and a second thread 320 executes a series of methods realizing the user program execution unit 211. When the thread ID of the second thread 320 is registered into the termination target queue 256, the following method termination processing is performed.

The user program execution unit 211 reads the thread ID from the termination target queue 256 (S301) and sends a thread stop instruction to the second thread 320 identified by the read thread ID (S302).

In response to the reception of the thread stop instruction, the second thread 320 terminates execution of the method being executed (S303) and throws an exception indicating that the thread is terminated (hereinafter, referred to as a thread termination exception) (S304). The user program execution unit 211 catches the thread termination exception (S305) and executes a method which should be executed following to the terminated method (S306). In stead of the caught thread termination exception, the user program execution unit 211 throws an exception indicating a general error (hereinafter, referred to as a general exception) (S307).

As described above, in the method termination processing of the implementation, if the method termination exception occurs in the second thread 320, the execution is terminated for each method rather than each thread and a method subsequent to the terminated method is executed. Therefore, during or before the execution of the method, a lock is obtained for a shared resource among threads or transaction processing is initiated for a database, and if the method subsequent to the terminated method will release the lock and will commit or roll back the transaction processing, only the execution of the method being executed is terminated and the subsequent method is continuously executed. In this way, consistency of the processing can be ensured by avoiding a situation where the lock remains obtained and where the transaction processing remains initiated. Therefore, the overall credibility of the information system 1 can be improved.

Figure 11:
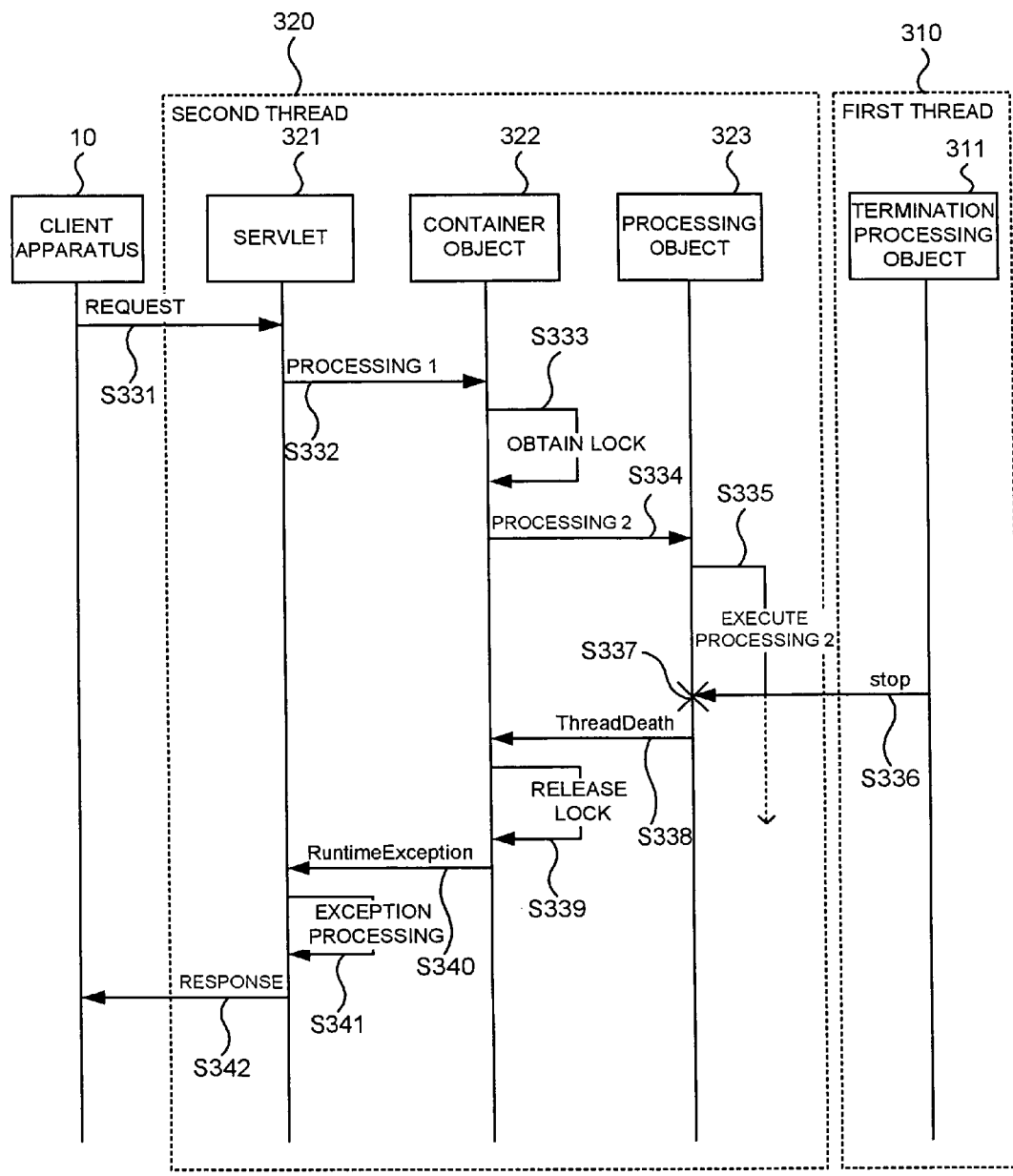
FIG. 11 is a diagram showing a specific example of the flow of method termination processing, according to one implementation of the present invention.

FIG. 11 is a diagram showing a specific example of applying the method termination processing to the request processing of the application server. In this figure, processing from (S336) to (S340) corresponds to the method termination processing described above.

A servlet 321 is an object receiving a HTTP request transmitted from the client apparatus 10 in the application server. A container object 322 is an object realizing the user program execution unit 211 in the second thread 320. A processing object 323 is an object generated from a class of the user program in the second thread 320. The processing object 323 is implemented as the EJB (trademark or registered trademark of Sun Microsystems, Inc.) object. A termination processing object 311 is an object realizing the method termination processing unit 212 in the first thread 311.

The servlet 321 has a request processing method for performing the processing corresponding to the HTTP request and the second thread initiates a series of methods by executing the request processing method of the servlet 321. The processing object 311 does not have a processing method 2 and the container object 322 has a processing method 1 calling the processing method 2 of the processing object 323, a lock acquisition method performing the processing for obtaining an exclusive lock against other threads, and a lock release method performing the processing for releasing the exclusive lock.

The second thread 320 executes the request processing method of the servlet 321 in response to the HTTP request transmitted from the client apparatus 10 (S331). In the request processing method, the servlet 321 calls the processing method 1 of the container object 322 (S332). The container object 322 calls the lock acquisition method from the processing method 1 (S333) and performs the processing for obtaining an exclusive lock in the lock acquisition method. When obtaining the exclusive lock, the container object 322 calls the processing method 2 of the processing object 323 (S334), and the processing object 323 executes the processing method 2 (S335).

At this point, for example, as in the case that the command acceptance unit 214 accepts a method termination command or that the monitor unit 213 detects time-out of the processing method 2 as described later, when the thread ID of the second thread is registered into the termination target queue 256, the termination processing object 311 reads the thread ID of the second thread from the termination target queue 256 in the first thread 310 and transmits a thread stop instruction (e.g., "stop" in Java (trademark or registered trademark of Sun Microsystems, Inc.)) to the second thread 320 (S336).

In response to the reception of the thread stop instruction, the second thread 320 throws a thread termination exception (e.g., ThreadDeath in Java (trademark or registered trademark of Sun Microsystems, Inc.)) and the processing object 323 terminates the execution of the processing method 2 (S337). Although the thread termination exception is passed to the container object 322 (S338), the container object 322 catches the thread termination exception and call the lock release method to be executed subsequent to execution of the processing method 2 of the processing object 323 (S339) to release the exclusive lock. The container object 322 throws a general exception (e.g., in Java (trademark or registered trademark of Sun Microsystems, Inc.), RuntimeException and the like, for example) in stead of the caught thread termination exception. The general exception is passed to the main object (S340). The servlet 321 catches the general exception to perform the exception processing (S341) and returns a response to the HTTP request (S342).

As described above, since the lock release method of the container object 322 which should be executed subsequent to execution of the processing method 2 of the processing object 323, the processing consistency with other executed threads can be ensured by avoiding a situation where the exclusive lock remains obtained.

Also, since the execution of the second thread 320 is not entirely terminated in response to the thread termination instruction, the servlet 321 can returns the response by the exceptional processing, indicating that an error occurs in the execution of the processing method 2.

Also, since the second thread is continuously executed, the second thread 320 does not have to be activated again and a response can be quickly returned to the subsequent request from the client apparatus 10. Therefore, the responsiveness of the information processing system can be improved.

Figure 12:
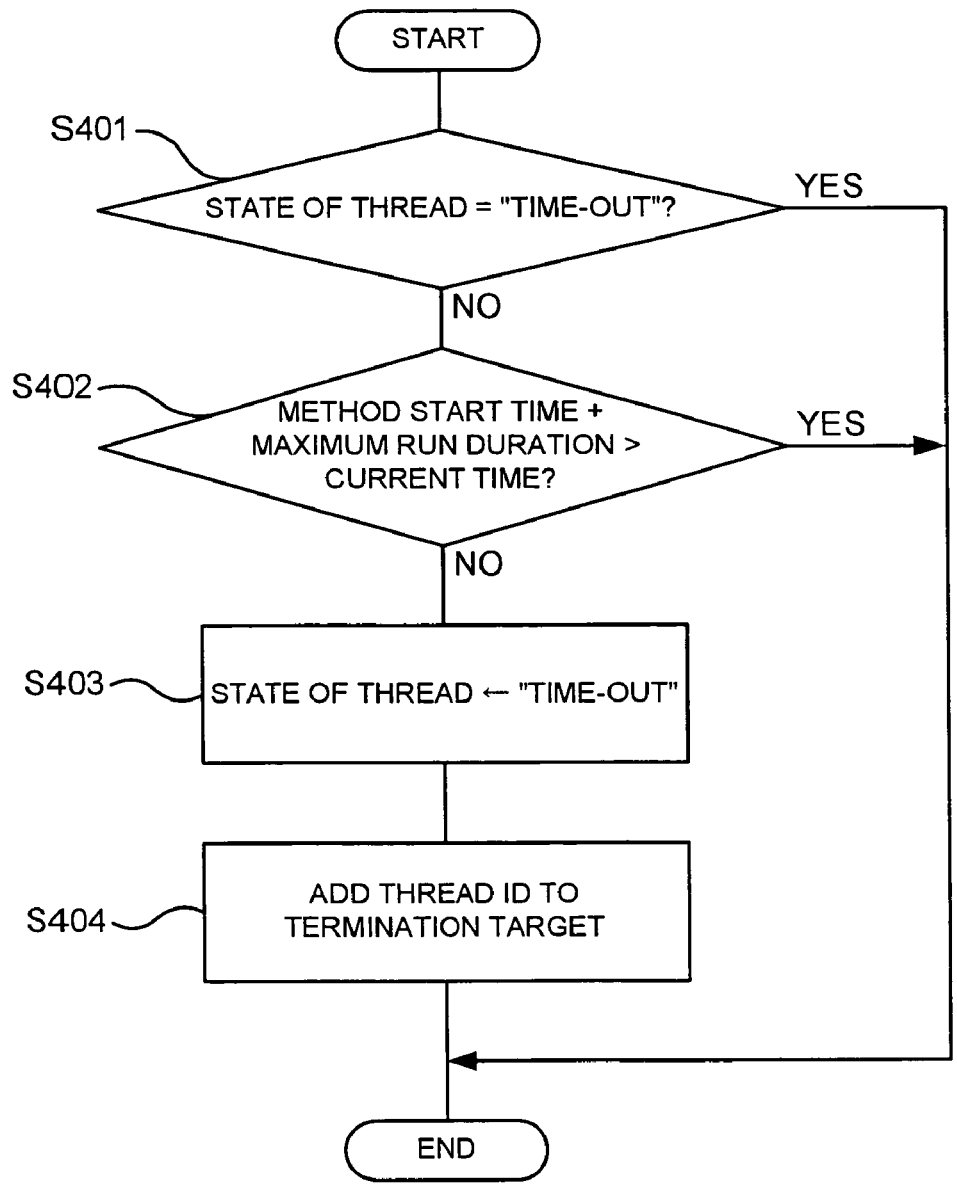
FIG. 12 is a diagram showing a flow of time-out monitor processing, according to one implementation of the present invention.

Then, time-out monitor processing is described, which is a trigger for performing the method termination processing described above. FIG. 12 is a diagram for describing a flow of the time-out monitor processing.

The monitor unit 213 performs the processing shown in FIG. 12 by considering each of all the threads stored in the thread information storage unit 253 as an inspection target thread.

The monitor unit 213 refers to the thread information storage unit 253 to determine whether a state of a thread corresponding to the thread ID of the inspection target thread (hereinafter, referred to as an inspection target ID) is "time-out" or not (S401). If the state of the thread is "time-out" (S401: YES), the monitor unit 213 exits the processing.

If the state of the thread is not "time-out" (S401: NO), the monitor unit 213 reads out a method name of the method for which the inspection target thread is being executed from the call stack of the method processing information storage unit 251 corresponding to the inspection target ID and reads out a start time and a maximum run duration corresponding to the read thread name and the inspection target ID from the thread information storage unit 253. If current time is exceeded by a time obtained by adding the maximum run duration to the start time of the method (S402: YES), i.e., if the runtime from the start time of the method to the current time (a run duration calculation unit) exceeds the maximum time and is not timed out, the monitor unit 213 exits the processing.

On the other hand, if the current time is not exceeded by a time obtained by adding the maximum run duration to the start time of the method and if the execution of the method is timed out (S402: NO), the monitor unit 213 sets the state of the thread of the thread information storage unit 253 corresponding to the inspection target ID to "time-out" (S403) and registers the inspection target ID into the termination target queue 256 (S404).

Figure 13:
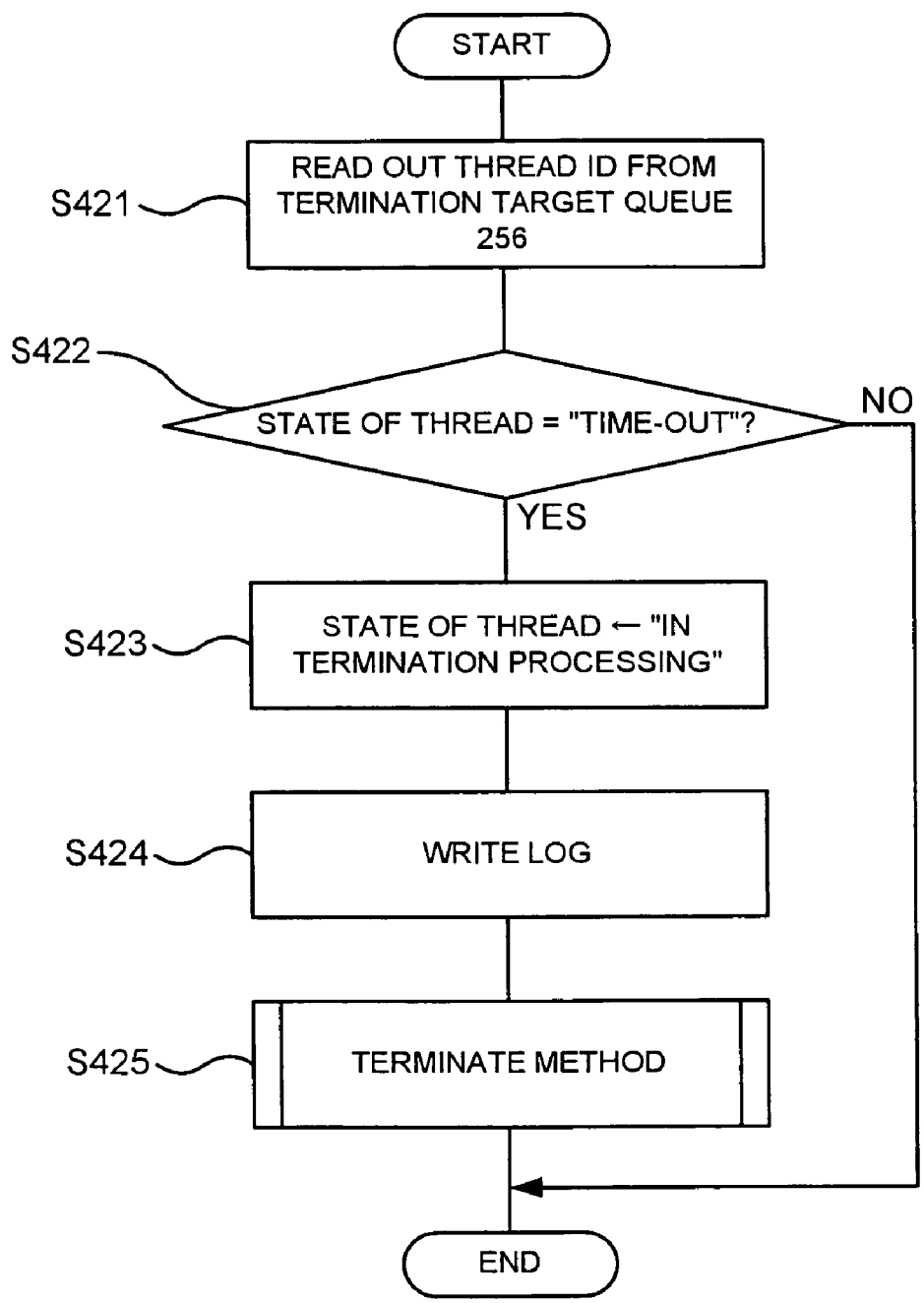
FIG. 13 is a diagram for describing the flow of method termination processing, according to one implementation of the present invention.
Figure 14:
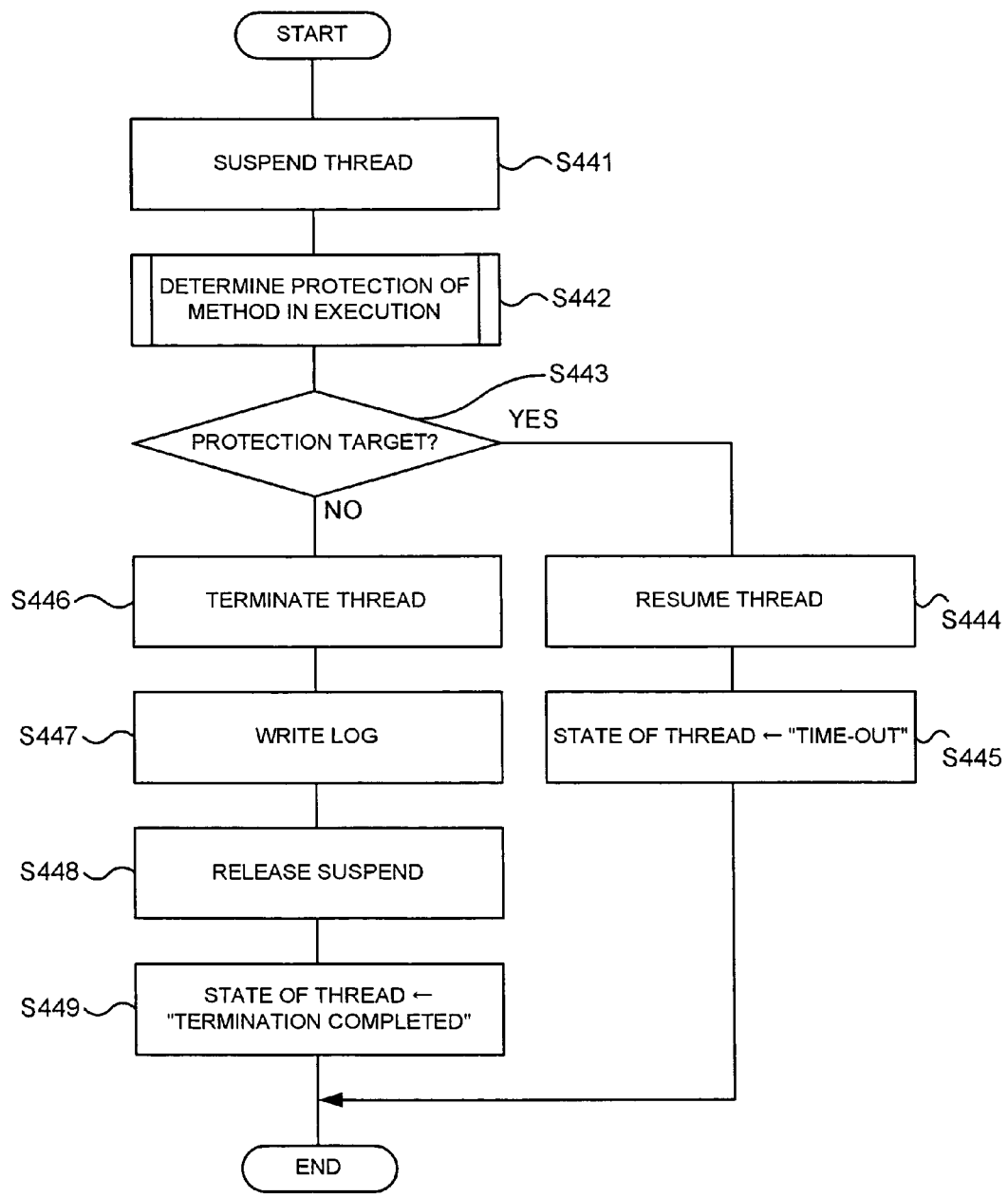
FIG. 14 is a diagram for describing the flow of method termination processing, according to one implementation of the present invention.
Figure 15:
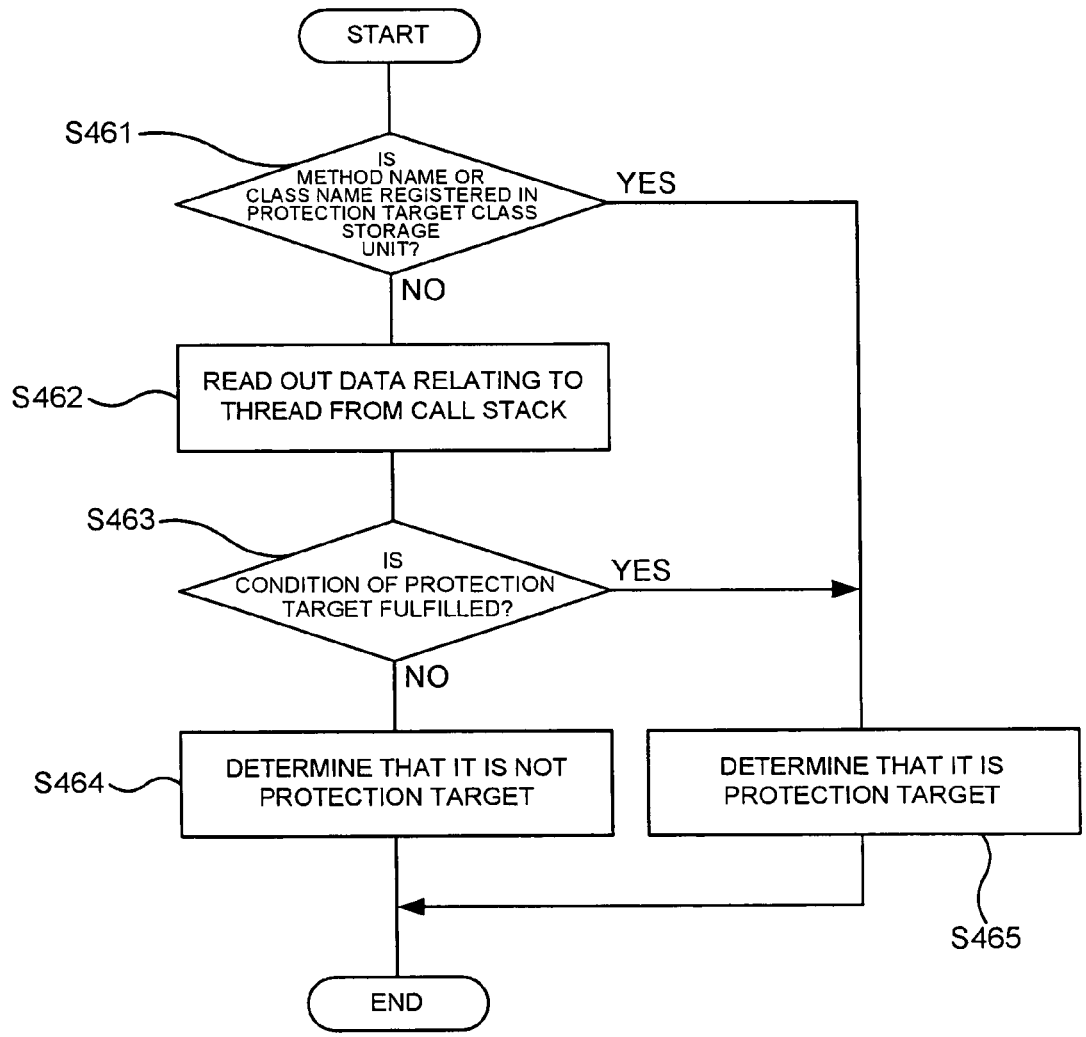
FIG. 15 is a diagram showing a flow of processing which determines whether a method is defined as a protection target or not, according to one implementation of the present invention.

If the thread ID is registered into the termination target queue 256, the method termination processing described above is performed by the method termination processing unit 212. FIG. 13 to FIG. 15 are diagrams for describing details of the processing corresponding to (S301) to (S302) of FIG. 10 out of the method termination processing described above which is performed when the runtime of the method is timed out.

As shown in FIG. 13, the method termination processing unit 212 reads out a thread ID registered in the termination target queue 256 (S421) and determines for a thread corresponding to the read thread ID (hereinafter, referred to as a termination target ID) whether the state is "time-out" or not (S422). If the state of the thread is not "time-out" (S422: NO), the method termination processing unit 212 terminates the processing.

If the state of the thread is "time-out" (S422: YES), the method termination processing unit 212 sets a state of a thread of the thread information storage unit 253 corresponding to the termination target ID to "in termination processing" (S423), and the log writing unit 216 reads out data relating to the method (hereinafter, referred to as a termination target method) for which the thread identified by the termination target ID is being executed from the call stack of the method processing information storage unit 251 corresponding to the termination target ID and writes the data into a log-file (S424). The method termination processing unit 212 terminates the termination target method with the processing shown in FIG. 14.

As shown in FIG. 14, the method termination processing unit 212 transmits a suspend instruction (e.g., "suspend" in Java (trademark or registered trademark of Sun Microsystems, Inc.)) to the termination target thread to suspend the termination target thread (S441). From the call stack corresponding to the termination target ID of the method processing information storage unit 251, the method termination processing unit 212 obtains the method name of the method for which the termination target thread is being executed and determines with the processing shown in FIG. 15 whether this method is set as the protection target (S442) (a protection determination unit).

As shown in FIG. 15, the method termination processing unit 212 determines whether or not the registration into the protection target class storage unit 254 has been performed for the method name of the termination target method or the class name of the class to which the termination target method belongs (S461). If the method name of class name is not registered (S461: NO), the method termination processing unit 212 reads out data relating to the termination target method from the call stack corresponding to the termination target ID of the method processing information storage unit 251 (S462). The method termination processing unit 212 determines whether or not the read data relating to the termination target method fulfill each condition stored in the protection target processing condition storage unit 255 (S463), and if the condition is not fulfilled (S463: NO), it is determined that the termination target method is not defined as a protection target (S464).

On the other hand, if the method name or class name is stored in the protection target class storage unit 254 (S451: YES) or if the data relating to the termination target method read from the call stack fulfill any conditions stored in the protection target processing condition storage unit 255 (S463: YES), the method termination processing unit 212 determines that the termination target method is defined as a protection target (S465).

If the termination target method is a protection target (FIG. 14: S443: YES), the method termination processing unit 212 transmits a suspend release instruction (e.g., resume in Java (trademark or registered trademark of Sun Microsystems, Inc.)) to the termination target thread to release the suspension of the termination target thread (S444). The method termination processing unit 212 restores the state of the thread of the thread information storage unit 253 corresponding to the termination target ID to "time-out" (S445) and terminates the processing.

If the termination target method is not a protection target (S443: NO), the method termination processing unit 212 transmits a thread termination instruction to the termination target thread (S446). From the call stack of the method processing information storage unit 251 corresponding to the termination target ID, the log writing unit 216 reads out information about the termination target thread and writes the information into a log file (S447). The method termination processing unit 212 transmits a suspend release instruction to the termination target thread to release the suspension of the termination target thread (S448) and sets the state of the thread of the thread information storage unit 253 corresponding to the termination target ID to "termination completed" (S449).

Figure 16:
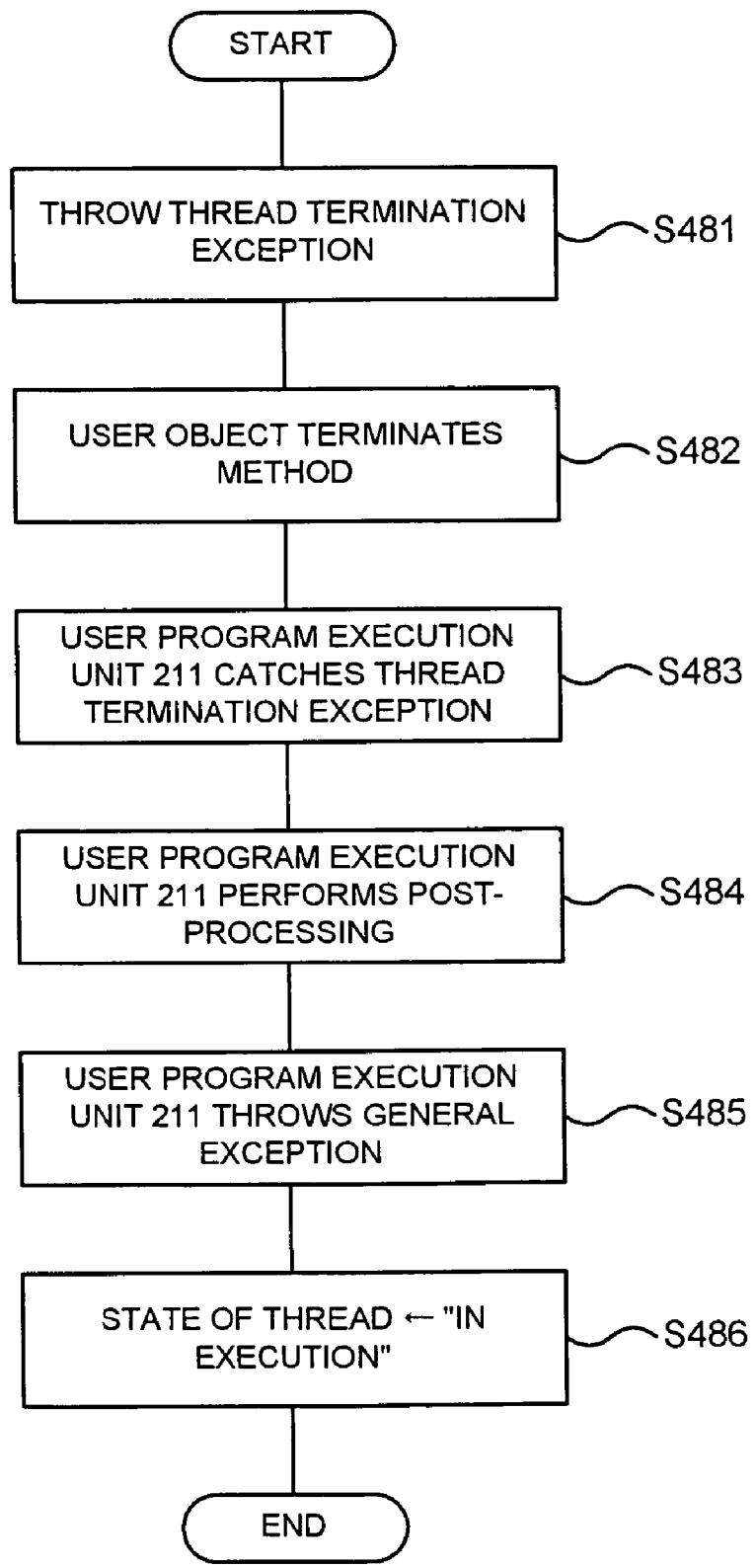
FIG. 16 is a diagram showing a flow of processing when a thread termination exception occurs.

FIG. 16 is a diagram for describing details of the processing corresponding to (S303) to (S308) of FIG. 10 out of the method termination processing described above which is performed when the runtime of the method is timed out.

When a thread termination exception is thrown in the termination target thread (S481), the thread termination exception is passed to an object of the user program (hereinafter, referred to as a user object) and the user object terminates the execution of the method (S482). Then, the thread termination exception is transmitted to the user program execution unit 211, and the user program execution unit 211 catches the thread termination exception (S483). When catching the thread termination exception, the user program execution unit 211 performs post-processing (S484) such as the release of the lock and the rollback of the transaction for the database, for example, and throws an exception indicating a general error (S485). Also, for the state of the thread of the thread information storage unit 253 corresponding to the thread ID of the thread for which the user program execution unit 211 is executed, the user program execution unit 211 sets the state of the thread to "in execution" (S486).

In this way, the thread termination exception occurred in the thread is caught by the user program execution unit 211, and after the post-processing such as the release of the lock and the rollback of the transaction for the database, the exception indicating a general error is thrown. Therefore, if the method of the user object is stopped, since the post-processing is performed by the user program execution unit 211, a deadlock between threads or inconsistency of data can be prevented. Thus, the credibility of the information processing system 1 can be enhanced. Also, since the processing of the thread itself is continued, the thread does not have to be activated again. Therefore, the processing load due to the activation of the thread is reduced and the overall processing efficiency of the information processing system 1 can be enhanced.

In the server apparatus 20 of the implementation, if processing of a method is not terminated within a predetermined time, the execution of that method is terminated. Therefore, if a method exists which performs the processing wasting the CPU resource of the system and increasing the overall load of the information processing system 1 due to, for example, an endless loop, the method can be terminated after the predetermined time elapses. In this way, by limiting the time period when the processing load of the server apparatus 20 is increased due to an endless loop to the predetermined time, a high-load state can be prevented from being continued. Therefore, the overall processing efficiency of the information processing system 1 can be enhanced.

Also, in the server apparatus 20 of the implementation, by setting a method to be the protection target in accordance with the class name, the method name and the processing performed in the method, the execution can be allowed not to be terminated for the method set as the protection target. Therefore, more flexible operation is enabled. For example, if a user program is developed which performs exclusion control without utilizing the container function, prevention can be provided against a situation where the lock remains obtained or against a deadlock by setting a method executed between the acquisition and release of the exclusive lock as the protection target. In this way, the overall credibility of the information processing system 1 can be enhanced.

Also, in the implementation, the contents of the call stack, log information and transaction information is written into log files twice, i.e., when runtime of a method is timed out and when a method is terminated. Therefore, by comparing these log files, a developer of a user program can closely compare a state of a thread when the runtime is timed out to a state of a thread after the method is terminated. In this way, the developer can easily comprehend recursive calling of a method, an abnormal variable value, an access to an unauthorized address and the like, for example. Therefore, the developer can easily examine the cause of a bug. Also, for example, by application to a test at the time of the development of the user program, an effective and efficient test can be performed.

According to the present invention, consistency of processing can be ensured.

Although the implementations of the present invention have been described hereinabove, the implementations are only for the purposes of facilitating understanding of the present invention, rather than limiting the interpretation of the present invention. The present invention may be modified and altered without departing from the spirit thereof and the present invention encompasses equivalents thereof.

What is claimed is:

1. A process for executing methods in an information processing apparatus which executes first and second threads which executes the methods, the process comprising:
    transmitting by the first thread to the second thread a stop instruction for terminating execution of the second thread;
    in response to the reception of the stop instruction, terminating by the second thread execution of a first method in execution and initiating execution of a second method that is to be executed subsequent to the first method;
    storing a maximum run duration of the first method into a memory;
    transmitting by the first thread the stop instruction to the second thread if a run duration of the first method exceeds the maximum run duration;
    writing, by the first thread, information on the execution of the first and second methods executed by the second thread into a memory when the run duration of the first method exceeds the maximum run duration; and
    writing, by the second thread, information on the execution of the first and second methods executed by the second thread into the memory when the second thread terminates the execution of the first method.

2. The process for executing methods of claim 1, further comprising:
    storing information identifying a method that is not to be terminated into a memory;
    determining by the first thread whether the first method is the method identified by the information or not; and
    transmitting by the first thread the stop instruction to the second thread if the first method is not the method identified by the information.

3. The process for a method of claim 1, further comprising:
    storing a maximum run duration of the first method into a memory; and
    adding by a third thread information identifying the second thread to a queue established in the memory when the run duration of the first method executed by the second thread exceeds the maximum run duration,
    wherein the first thread reads out the information identifying the second thread registered in the queue and transmits the stop instruction to the second thread identified by the read information.

4. The process for a method of claim 1, further comprising:
    determining by the second thread whether or not at least one of acquisition of a lock to a resource shared with another thread and transaction processing against a database is performed in the first method; and
    performing by the second thread at least one of the release of the lock and the rollback of the transaction processing if at least one of the acquisition of the lock and the transaction processing is performed, when the second thread terminates the first method.

5. The process for executing methods of claim 1, further comprising:
    accepting from a user an instruction indicating that execution of a method of the second thread is to be terminated,
    wherein the first thread transmits the stop instruction to the second thread in response to the instruction.

6. The process for a method of claim 1 or 4, further comprising:
    determining by the second thread whether or not transaction processing against a database is performed in the first method; and
    performing by the second thread the rollback of the transaction processing if the transaction processing is performed, when the second thread terminates the first method.

7. An information processing apparatus comprising:
    a CPU;
    a memory;
    a thread execution unit executing first and second threads which executes methods;
    a stop instruction transmission unit forcing the first thread to transmit a stop instruction for terminating execution of the second thread to the second thread;
    a method execution unit, in response to the reception of the stop instruction, forcing the second thread to terminate execution of a first method in execution and to initiate execution of a second method that is to be executed subsequent to the first method;
    stack storing a method executed by the second thread;
    a maximum run duration storage unit storing the maximum run duration of the method executed by the second thread correspondingly to information identifying the method executed by the second thread;
    an execution start time storage unit storing correspondingly information identifying the method executed by the second thread and an execution start time when the method is stored in the stack;
    a protection method storage unit storing protection target method identification information which is information identifying a protected method that is not to be terminated;
    a run duration calculation unit reading out the maximum run duration and the execution start time corresponding to the information identifying the first method to calculate a run duration of the first method based on the execution start time; and
    a protection determination unit determining whether or not the first method is the protected method identified by the protection target method identification information stored in the protection method storage unit if the run duration exceeds the maximum run duration, wherein the stop instruction transmission unit forces the first thread to transmit the execution termination instruction to the second thread if the first method is not the protected method identified by the protection target method identification information.

8. Computer-readable storage medium comprising program instructions that cause a computer which executes first and second threads to perform:
- transmitting by the first thread a stop instruction for terminating execution of the second thread to the second thread;
- in response to the reception of the stop instruction terminating by the second thread execution of a first method in execution and initiating execution of a second method that is to be executed subsequent to the first method;
- storing a maximum run duration of the first method into a memory;
- transmitting by the first thread the stop instruction to the second thread if a run duration of the first method exceeds the maximum run duration;
- writing, by the first thread, information on the execution of the first and second methods executed by the second thread into a memory when the run duration of the first method exceeds the maximum run duration; and
- writing, by the second thread, information on the execution of the first and second methods the methods executed by the second thread into the memory when the second thread terminates the execution of the first method.

9. The computer-readable storage medium of claim 8, further comprising program instructions to perform:
- determining by the second thread whether or not one of acquisition of a lock to a resource shared with another thread is performed in the first method; and
- performing by the second thread at least one of the release of the lock if one of the acquisition of the lock is performed, when the second thread terminates the first method.

10. The computer-readable storage medium of claim 8 or 9, further comprising program instructions to perform:
- determining by the second thread whether or not transaction processing against a database is performed in the first method; and
- performing by the second thread the rollback of the transaction processing if the transaction processing is performed, when the second thread terminates the first method.

* * * * *